H. BOGATY.
GEAR BOX.
APPLICATION FILED JAN. 16, 1920.
1,398,171.
Patented Nov. 22, 1921.
2 SHEETS—SHEET 1.
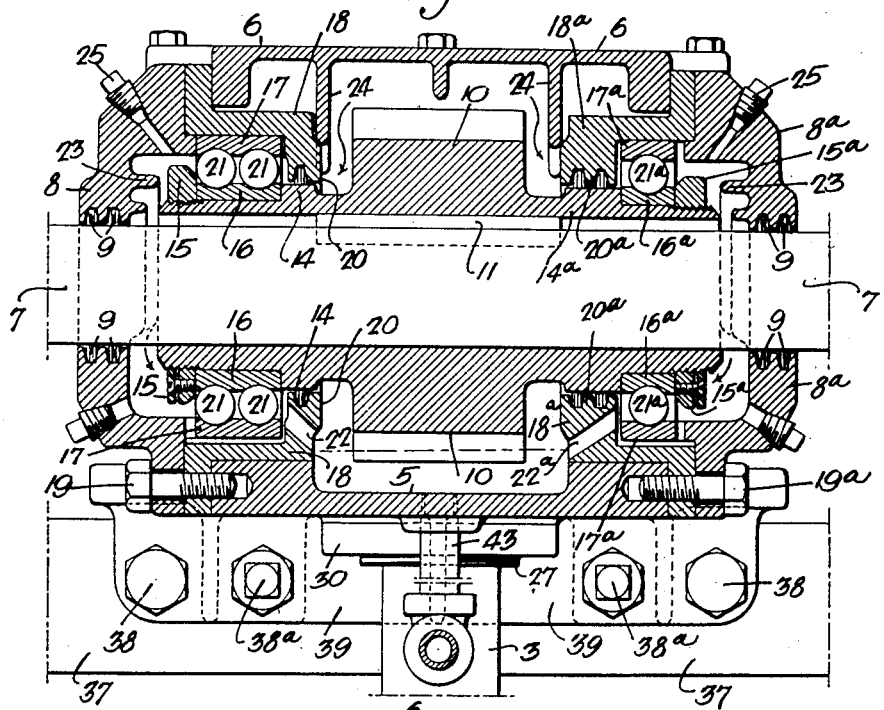
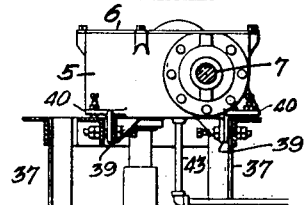
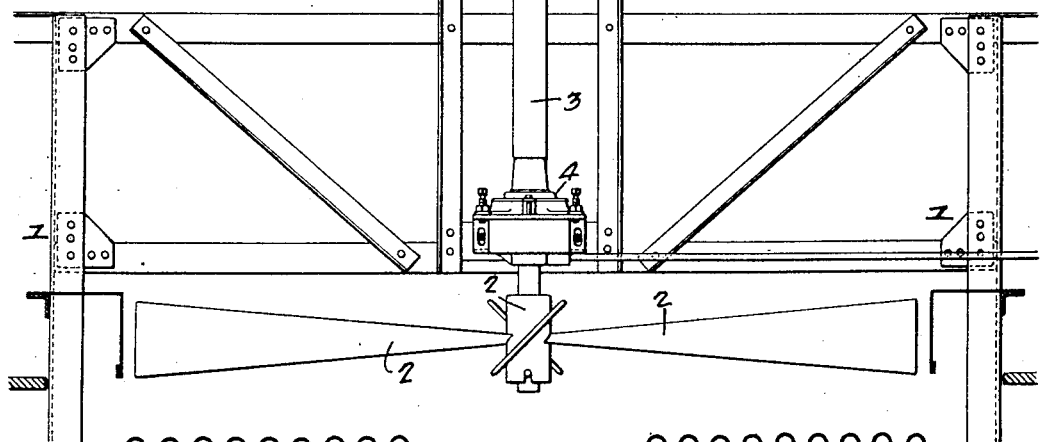
Inventor-
Hermann Bogaty.
by his Attorneys-
Howson & Howson

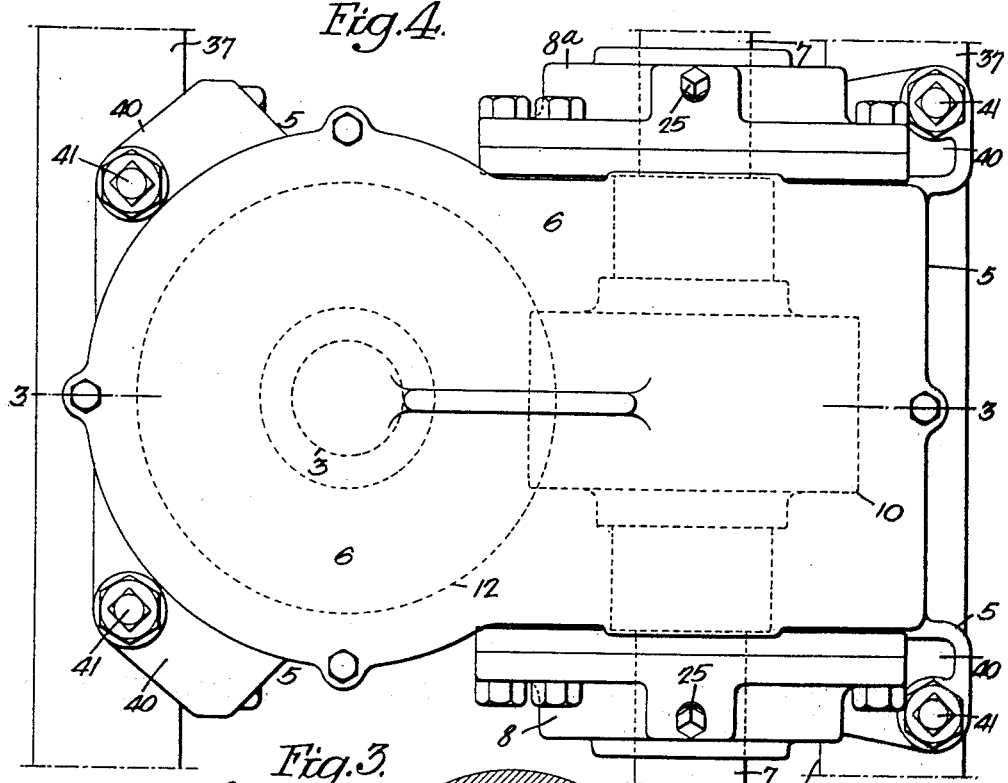
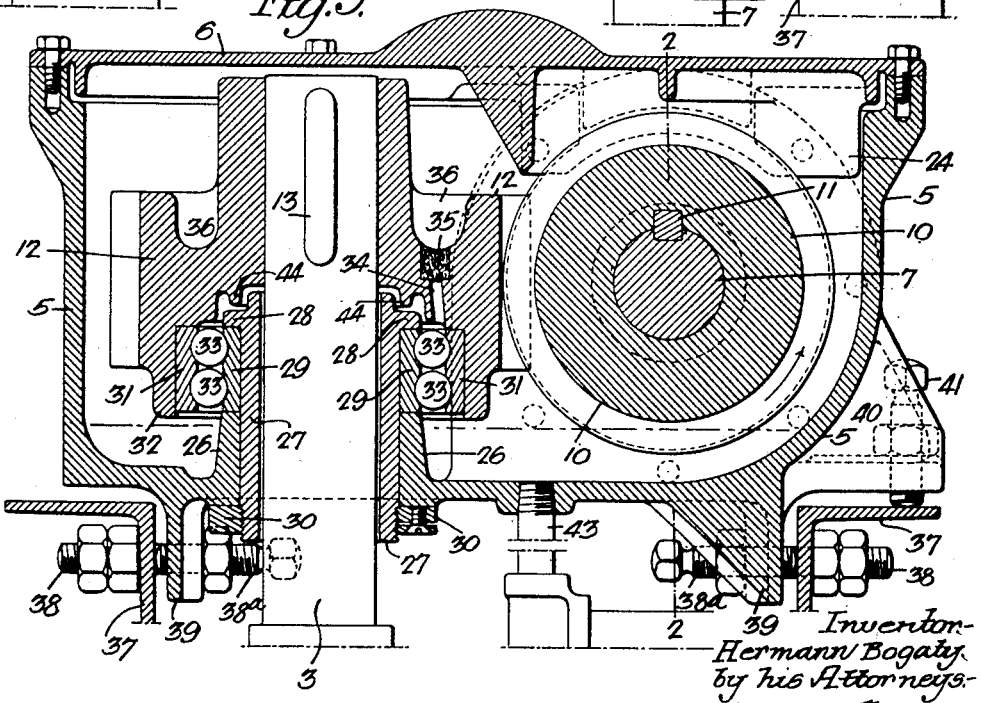

UNITED STATES PATENT OFFICE.

HERMANN BOGATY, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

GEAR-BOX.

1,398,171.   Specification of Letters Patent.   Patented Nov. 22, 1921.

Application filed January 16, 1920. Serial No. 351,901.

*To all whom it may concern:*

Be it known that I, HERMANN BOGATY, a citizen of Russia, (having declared my intention of becoming a citizen of the United States,) residing in Philadelphia, Pennsylvania, have invented certain Improvements in Gear-Boxes, of which the following is a specification.

My invention relates to certain improvements in gear boxes for fan shafts.

One object of my invention is to provide means for allowing the driving elements to be thoroughly lubricated, and also to provide means whereby the lubricant will be circulated in the box, and to so design the box that the lubricant will not escape and run down the shaft.

A further object of the invention is to provide ball bearings for the driving and driven shafts and to provide means for circulating lubricant through said bearings.

In the accompanying drawings:

Figure 1 is a view of the upper portion of a drying apparatus illustrating the application of my invention thereto;

Fig. 2 is a sectional elevation on the line 2—2. Fig. 3, illustrating the bearings for the driving shaft;

Fig. 3 is a sectional view on the line 3—3, Fig. 4, showing the bearings for the driven shaft, and Fig. 4 is a plan view of the box.

My invention is especially adapted for use in connection with fan shafts of drying machines. In the present instance, the bearing is illustrated as located above the drying chamber. In this type of machine, the driving mechanism is outside of the casing 1. The fan 2 is mounted on a vertical shaft 3 adapted to the lower bearing 4 and an upper bearing in the gear box 5. The fan circulates air through the drying chamber and heating chamber and it is necessary to design the gear boxes so that the gearing can run in oil, or other lubricant. They must be so designed that the lubricant will not drip down the shaft and escape into the drying or the heating chamber, as the material being dried is usually of such a character that grease or oil would be detrimental to it.

It will be understood that my invention can be applied to driving other vertical shafts without departing from the essential features of the invention.

The body 5 of the box is made in a single casting. 6 is a cover plate. 8—8ª are caps at the ends of the box and these caps have openings for the passage of a driving shaft 7, which may extend throughout the length of the machine and may pass through other boxes, if desired. The walls of the openings in the caps 8 are grooved, as at 9, for the reception of felt packing which prevents the escape of lubricant at the ends of the box. Secured to the shaft, in the present instance, is a gear wheel 10 fastened thereto by a key 11. This gear wheel drives a gear wheel 12 secured to the vertical shaft 3 by a key 13, so that the vertical shaft 3 is driven from the shaft 7 through the gears. The gear 10 has extended hubs and mounted between a shoulder 14 on one hub and a ring 15 screwed onto the hub is an inner raceway 16. The outer raceway 17 is located in an annular ring 18 secured to the box 5 by bolts 19. This ring has an inner flange 20 having a groove therein for felt, as shown. Mounted between the two raceways 16 and 17 are two sets of balls 21. The cap 8 holds the outer raceway 17 in place. The cap is secured by the same bolts that secure the ring section 18. On the opposite side of the gear wheel 10 is a ring 18ª located between the body 5 of the box and the cap 8ª. The ring and cap are held in place by bolts 19ª. The inner flange 20ª of the ring 18ª is wider than the flange 20 of the ring 18 and has two grooves therein for felt. Located between the ring and the hub is a ball bearing consisting of an inner raceway 16ª and an outer raceway 17ª and one set of balls 21ª. The inner raceway is held to a flange 14ª on the hub by a ring 15ª while the outer ring is loosely mounted in the space between the flange of the ring 18ª and the cap 8ª. In the two rings are inclined passages 22, 22ª for the lubricant so that any lubricant lifted by the wheel 10 will flow to and through the ball bearings and return through the passages 22 and 22ª. Ribs 23 on the caps 8, 8ª project into the chamber and extend over the shaft, directing any lubricant away from the caps and working out of the box. The cover plate 6 has ribs 24, which direct the lubricant away from the plate. In each cap 8, 8ª, are screw plugs 25, which close filling passages for lubricant and communicating with the bottom of the box 5 is a drain pipe 43. The vertical shaft 3, which, in the present instance, is a fan shaft, extends into the box and through a column 26 cast integral with the body of the box. Within this column is an extended sleeve 27 having a flange 28 at its upper end and between this flange and the end of the column is located the inner raceway 29 of a ball bearing. This sleeve has screw threads at its lower end to which is adapted a nut 30 in the form of a ring. The outer raceway 31 is located in the extension 32 of the spiral gear wheel 12 and between the two raceways are balls 33. This construction prevents any lubricant from overflowing and passing down the fan shaft into the machine.

As an extra precaution, I provide an annular rib 44 on the gear wheel which extends over a projecting portion of the sleeve 27 so that in the event of lubricant working into the space above the boxes it will not splash onto the shaft.

In order to insure the lubrication of the bearings, I provide a channel 34 closed by a porous packing 35, which communicates with an annular channel 36 in the gear wheel 12 so that any lubricant gaining access to this channel will flow through the porous element 35 and into the channel 34 and through the ball bearing.

The casing 5 is adjustably mounted on a frame 37 projecting from the main frame 1 of the machine. In the present instance, 38 are bolts having nuts which can be adjusted. These bolts pass through the frame and through projections 39 on the box.

Set screws 38ª also pass through the projections 39 and bear against the inside of the frame 37. By this means, the box can be adjusted laterally. On the box are brackets 40 through which extend set screws 41 for adjusting the box vertically.

From the above construction, it will be seen that I am enabled to make a box particularly adapted as an overhead bearing for gearing which must be lubricated and by which a fan shaft can be driven without the liability of the lubricant passing down the fan shaft, and it will be seen that I use the gear wheel 10 mounted on the horizontal shaft 7 as a circulating pump, drawing the lubricant from the bottom of the box and carrying it up and discharging it over the top of the gear and the extended hub. This lubricant finds its way through the ball bearings at either side of the gear and is drawn down by suction through the lower portions of the ball bearings and through the passages 22, 22ª into the bottom of the box. This insures complete circulation and also prevents the escape of the lubricant through the end caps of the box as the suction tends to draw the lubricant toward the center of the box at the bottom.

I claim:

1. The combination of a box; a horizontal and a vertical shaft extending into the box; gear wheels on each shaft, one gear wheel meshing with the other, the gear wheel on the horizontal shaft having an extended hub; ball bearings between the hubs and the casing at each side of the gear wheel; a column projecting from the bottom of the box and encircling the vertical shaft; and a ball bearing between the column and the gear wheel mounted in the vertical shaft.

2. The combination of a box having two ring sections; two caps and a top plate; a horizontal shaft extending entirely through the box and through the rings and caps, said shaft having an extended hub at each side; ball bearings between the rings and the extensions of the hubs; a vertical shaft extending into the box; and a gear wheel on the shaft meshing with the gear wheel on the horizontal shaft.

3. The combination of a box having a body portion; two ring sections and two caps; means for securing the rings and caps to the body portions; a horizontal shaft extending through the rings and caps; a gear wheel on the shaft having an extended hub at each side, each end of the hub having a flange and a screw thread; a screw ring on each end of the hub; an inner raceway located between the flange and the ring of the hub; an outer raceway located between the ring and the flange of the box; balls mounted between the two raceways; and a vertical shaft extending into the box and having a gear wheel thereon meshing with the gear wheel on the horizontal shaft.

4. The combination in a gear box, of a horizontal shaft extending through the box; a gear wheel thereon; a vertical shaft extending into the box through the bottom thereof; a gear wheel on the said shaft meshing with the first mentioned gear wheel; a column projecting into the box from the bottom thereof and surrounding the vertical shaft; a sleeve mounted in the column and extending above the normal fluid line of the lubricant; an inner and an outer raceway; and balls between the raceways; the inner raceway being carried by the column and the outer raceway by the gear wheel.

HERMANN BOGATY.